United States Patent
Angiwal

(10) Patent No.: US 10,212,673 B2
(45) Date of Patent: Feb. 19, 2019

(54) METHOD OF DETERMINING THE PROXIMITY OF UE IN D2D COMMUNICATION NETWORK

(71) Applicant: Samsung Electronics Co., Ltd., Gyeonggi-do (KR)

(72) Inventor: Anil Angiwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 15/535,024

(22) PCT Filed: Dec. 9, 2015

(86) PCT No.: PCT/KR2015/013465
§ 371 (c)(1),
(2) Date: Jun. 9, 2017

(87) PCT Pub. No.: WO2016/093624
PCT Pub. Date: Jun. 16, 2016

(65) Prior Publication Data
US 2018/0041971 A1    Feb. 8, 2018

(30) Foreign Application Priority Data

Dec. 9, 2014   (IN) .......................... 6226/CHE/2014
Nov. 25, 2015  (IN) .......................... 6226/CHE/2014

(51) Int. Cl.
*H04W 4/70*     (2018.01)
*H04W 52/24*    (2009.01)
(Continued)

(52) U.S. Cl.
CPC ......... *H04W 52/283* (2013.01); *H04W 4/021* (2013.01); *H04W 8/005* (2013.01);
(Continued)

(58) Field of Classification Search
CPC ........................... H04W 52/283; H04W 4/021
(Continued)

(56) References Cited

U.S. PATENT DOCUMENTS 8,554,200 B2    10/2013  Ribeiro et al.
2013/0250890 A1  9/2013  Kim et al.
(Continued)

FOREIGN PATENT DOCUMENTS

WO     2013166721 A1   11/2013
WO     2014052175 A1    4/2014

*Primary Examiner* — Ganiyu A Hanidu

(57) ABSTRACT

The present disclosure may be applied to intelligent services based on the 5G communication technology and the IoT-related technology, such as smart home, smart building, smart city, smart car, connected car, health care, digital education, smart retail, security and safety services.
The present invention describes a method of determining proximity of an entity in a device to device (D2D) communication network. The method comprises receiving by a first entity, a message from a second entity, ascertaining by the first entity, a first power information of a signal at which the message being received at the first entity, determining by the first entity, a second power information of the signal at which the message being transmitted by the second entity, determining by the first entity, path loss based on processing the first power information and the second power information, and determining by the first entity, the proximity of the second entity from the first entity based on the determined path loss.

20 Claims, 4 Drawing Sheets

(51) Int. Cl.
   *H04W 52/28*    (2009.01)
   *H04W 52/38*    (2009.01)
   *H04W 64/00*    (2009.01)
   *H04W 4/021*    (2018.01)
   *H04W 8/00*     (2009.01)
   *H04W 72/04*    (2009.01)
   *H04W 76/14*    (2018.01)

(52) U.S. Cl.
   CPC ....... *H04W 52/242* (2013.01); *H04W 52/246* (2013.01); *H04W 52/383* (2013.01); *H04W 64/006* (2013.01); *H04W 72/048* (2013.01); *H04W 4/70* (2018.02); *H04W 52/28* (2013.01); *H04W 76/14* (2018.02)

(58) Field of Classification Search
   USPC .................................................. 455/522, 69
   See application file for complete search history.

(56) References Cited

U.S. PATENT DOCUMENTS

| | | | |
|---|---|---|---|
| 2014/0056220 A1* | 2/2014 | Poitau | H04W 76/14 370/328 |
| 2014/0185495 A1 | 7/2014 | Kuchibhotla et al. | |
| 2015/0063307 A1 | 3/2015 | Luo et al. | |
| 2015/0223141 A1* | 8/2015 | Chatterjee | H04W 40/246 370/329 |
| 2016/0212793 A1* | 7/2016 | Jung | H04W 76/14 |
| 2016/0309377 A1* | 10/2016 | Jung | H04W 36/0072 |
| 2016/0338124 A1* | 11/2016 | Byun | H04W 76/00 |
| 2017/0013497 A1* | 1/2017 | Lee | H04L 67/12 |
| 2017/0078863 A1* | 3/2017 | Kim | H04W 48/16 |

* cited by examiner

METHOD OF DETERMINING THE PROXIMITY OF UE IN D2D COMMUNICATION NETWORK

CROSS-REFERENCE TO RELATED APPLICATION(S) AND CLAIM OF PRIORITY

This application is a National Phase Entry of PCT International Application No. PCT/KR2015/013465, which was filed on Dec. 9, 2015, and claims a priority to Indian Patent Application No. 6226/CHE/2014, which was filed on Dec. 9, 2014, and claims a priority to Indian Patent Application No. 6226/CHE/2014, which was filed on Nov. 25, 2015, the contents of which are incorporated herein by reference.

TECHNICAL FIELD

The present invention generally relates to D2D Communication. The present invention more particularly relates to determining the proximity of UE with respect to another in D2D communication network.

BACKGROUND

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Device to Device (D2D) communication is being studied in communication standard groups to enable data communication services and proximity (or discovery) services between the UEs. Discovery is a process which determines that a D2D enabled User Equipment (UE) is in proximity of another D2D enabled UE. A discovering D2D enabled UE determines whether or not another D2D enabled UE is of interest to it using D2D Discovery. A D2D enabled UE is of interest to a discovering D2D enabled UE if its proximity is known by one or more authorized applications on the discovering D2D enabled UE. For e.g. a social networking application can be enabled to use D2D discovery feature. The D2D discovery is enabled on the D2D enabled UE of a given user for a social networking application to discovery and be discoverable by the D2D enabled UEs of his/her friends. In another example the D2D discovery is enabled on the D2D enabled UE of a given user for a search application to discover stores/restaurants etc. of its interest in its proximity. D2D enabled UE discovers other D2D enabled UEs in its proximity by using direct UE-to-UE signaling.

During the D2D communication a transmitting D2D UE transmits data packets to a group of D2D UEs or broadcast data packets to all the D2D UEs or sends unicast data packets to a specific D2D UE. D2D communication between the transmitter and receiver(s) is connectionless in nature i.e. there is no connection setup (or no control messages are exchanged) between the transmitter and receiver before the transmitter starts transmitting the data packets. During the transmission, the transmitter includes the source ID and the destination ID in the data packets. The source ID is set to the UE ID of the transmitter. The destination ID is the intended recipient of the transmitted packet. The destination ID indicates whether the packet is a broadcast packet or a unicast packet or a packet intended for a group.

During the discovery process the announcing UE (or discoverable UE) transmits a discovery message. The discovery message is transmitted by the D2D UE on discovery channel or discovery resources. The monitoring UE monitors the discovery resources to discover UE in its proximity.

SUMMARY

In the prior art, the monitoring UE can discover the UE but it does not know the range (or distance) at which the discovered UE is located. The range information is useful at the application layer for various proximity services like geo fencing. The range information is also useful in determining the power at which monitoring UE should respond after discovering the UE.

Thus, there is a need for a method to determine the proximity of UE in D2D communication network.

An embodiment of the present invention describes a method of determining proximity of an entity in a device to device (D2D) communication network. The method comprises receiving by a first entity (E1), a message from a second entity (E2), ascertaining by the first entity (E1), a first power information of a signal at which the message being received at the first entity (E1), determining by the first entity (E1), a second power information of the signal at which the message being transmitted by the second entity (E2), determining by the first entity (E1), path loss based on processing the first power information and the second power information, and determining by the first entity (E1), the proximity of the second entity (E2) from the first entity based on the determined path loss.

Another embodiment of the present invention describes a method of determining transmission power information by a user equipment (UE) in a device to device (D2D) communication network. The method comprises receiving by a first user equipment (UE1), a message from a second user equipment (UE2), determining by the first user equipment (UE1), a transmission power information of a signal at which the message being transmitted by the second user equipment (UE2), and determining by the first user equipment (UE1), a power information at which the first user equipment (UE1) transmits the message to the second user equipment (UE2).

Yet another embodiment of the present invention describes a method of determining transmission power information by a user equipment (UE) in a device to device (D2D) communication network. The method comprises receiving by a first user equipment (UE1), a message from a second user equipment (UE2), ascertaining by the first user equipment (UE1), a reception power information of a signal at which the message being received at the first user equipment (UE1), determining by the first user equipment (UE1), a transmission power information of the signal at which the message being transmitted by the second user equipment (UE1), determining by the first user equipment (UE1), path loss based on processing the transmission power information and the reception power information, and determining by the first user equipment (UE1), a power information at which the first user equipment (UE1) transmits the message to the second user equipment (UE2) using the determined path loss, thereby enabling decoding of the message at the second user equipment (UE2).

Figure 1:
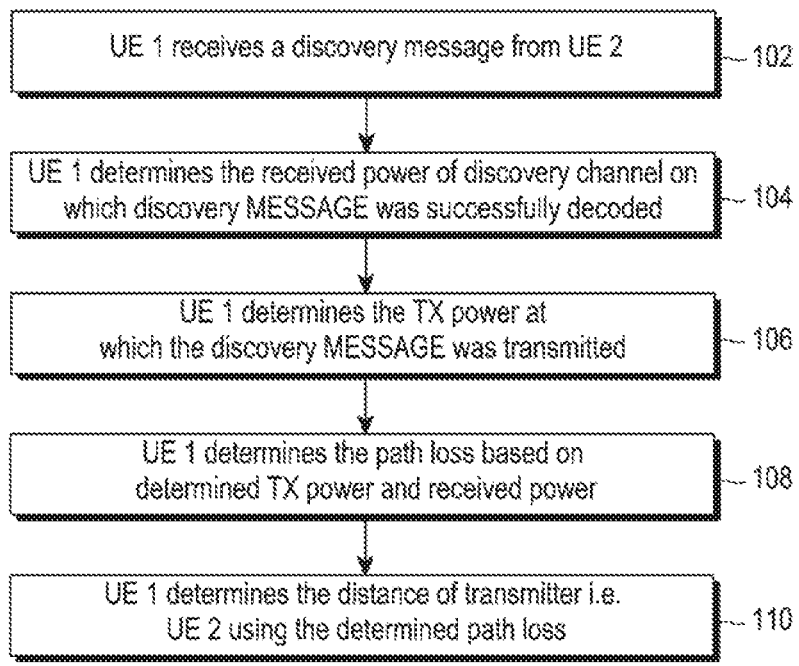
FIG. 1 is a flow diagram illustrating a method of determining proximity of a user equipment (UE) in a device to device (D2D) communication network, according to an embodiment of the present invention.

Although specific features of the present invention are shown in some drawings and not in others, this is done for convenience only as each feature may be combined with any or all of the other features in accordance with the present invention.

DETAILED DESCRIPTION

The embodiments of the present invention will now be described in detail with reference to the accompanying drawings. However, the present invention is not limited to the embodiments. The present invention can be modified in various forms. Thus, the embodiments of the present invention are only provided to explain more clearly the present invention to the ordinarily skilled in the art of the present invention. In the accompanying drawings, like reference numerals are used to indicate like components.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The term user equipment (UE1 or UE2) and entity (E1 or E2) are used interchangeably.

FIG. 1 is a flow diagram illustrating a method of determining proximity of user equipment (UE) in a device to device (D2D) communication network, according to an embodiment of the present invention. The method determines the range of UE (i.e. UE2) by another UE (i.e. UE1) by performing the following steps.

At step 102, the UE1 receives a message such as discovery message from the UE2. The message includes but not limited to, at least one of a discovery message, data packet, and control packet. At step 104, the UE1 measures the reception power at which the discovery message is received. Power is measured over time and frequency resources in which the discovery message is received. In one embodiment, the UE1 receives multiple discovery messages and averages the reception power at which the discovery message is received. At step 106, the UE1 then determines transmission power at which the discovery message is transmitted by the UE2. Further at step 108, the UE1 determines path loss based on the determined transmission power and the measured reception power. At step 110, the UE1 then determines the distance of the UE2 with respect to itself using the determined path loss. There is one to one relation between path loss and distance.

In D2D communication network, the power at which the discovery message is transmitted by the UE2 is not known to the UE1. The present invention describes various embodiments to determine the transmission power at which the discovery message is transmitted by the UE2 to the UE1.

In one embodiment, UE uses this method (described in FIG. 1) of determining the range if reception power and/or transmission power (TX) power is below a defined threshold. The threshold can be pre-defined or configured by the network entity or D2D server. Alternately, UE uses this method of determining the range for a certain range classes. The range classes for which this can be applicable can be pre-defined or configured by the network entity (or D2D server).

Embodiment 1

Figure 2:
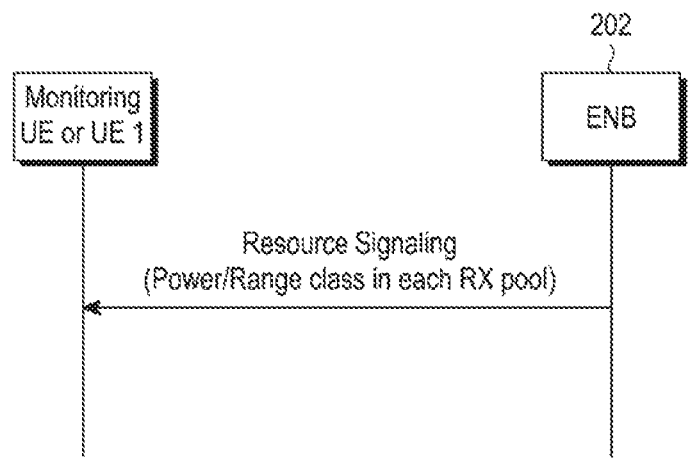
FIG. 2 is a flow diagram illustrating a method of determining transmission (TX) power, according to an embodiment of the present invention.

FIG. 2 is a flow diagram illustrating a method of determining transmission (TX) power, according to an embodiment of the present invention. The network entity (or eNB) 202 configures one or more resource pools (i.e. resource information or resource list) for transmission, the range class is associated with the proximity (or distance) of the network entity (or eNB) to the UE (i.e. UE1). The configured resource pools are broadcasted in System Information Blocks (SIB) or provided in dedicated signaling to UE (i.e. UE1). The transmission power or the range class or transmission power category is indicated in each resource pool. The UE selects the resource pool for transmission and the UE transmits to the network entity (or eNB) 202, information (or data) at transmission (TX) power corresponding to the resource pool. The range class to transmission power mapping is either pre-defined or broadcasted or dedicatedly signaled to UE. The transmission power category to transmission power mapping is either pre-defined or broadcasted or dedicatedly signaled to UE.

In this embodiment, the network entity (or eNB) 202 configures one or more resource pools (i.e. resource information or resource list) for reception. The configured resource pools are broadcasted in System Information Blocks (SIB) or provided in dedicated signaling to UE (i.e. UE1). The transmission power or the range class or the transmission power category is indicated in each of the resource pool for reception. The UE determines the resource pool of the resource in which the discovery message is received and the UE obtains the transmission power of received discovery message.

In one embodiment, the range class to transmission power mapping is either pre-defined or broadcasted or dedicatedly signaled to UE. The transmission power category to transmission power mapping is either pre-defined or broadcasted or dedicatedly signaled to UE.

Embodiment 2

Figure 3:
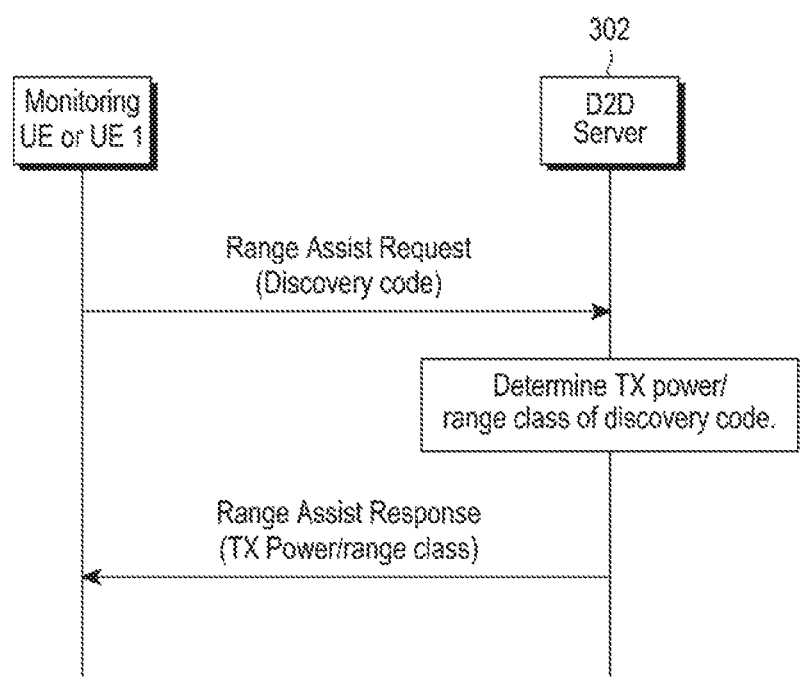
FIG. 3 is a flow diagram illustrating a method of determining transmission (TX) power, according to another embodiment of the present invention.

FIG. 3 is a flow diagram illustrating a method of determining transmission (TX) power, according to another embodiment of the present invention. In this embodiment, the UE1 sends the discovery code received in the discovery message to D2D server/Proximity-services (Pro-Se) Function 302. The D2D server/Pro-Se Function 302 then provides the range class or the transmission power associated with the discovered code to the UE1. The range class to transmission power mapping is either pre-defined or broadcasted or dedicatedly signaled to the UE1.

Embodiment 3

According to yet another embodiment of the present invention, the UE1 determines the transmission power by obtaining the transmission power or range class from the application layer. The application layer provides this along with application information to be monitored.

Embodiment 4

According to yet another embodiment of the present invention, the UE2 sends the transmission power, range class or transmission power category along with discovery message. The transmission power, range class or transmission power category can be encoded in a field in the discovery message. In one embodiment in which the range class is transmitted, the range class or transmission power mapping is either pre-defined or broadcasted or dedicatedly signaled to the UE2. In another embodiment in which transmission (TX) power category is transmitted, the transmission power category to transmission power mapping is either pre-defined or broadcasted or dedicatedly signaled to the UE2.

Then the UE1 obtains the range class or transmission power from the discovery message. In one embodiment in which the range class is transmitted, the range class or transmission power mapping is either pre-defined or broadcasted or dedicatedly signaled to the UE1. In another embodiment in which transmission (TX) power category is transmitted, the transmission power category to transmission power mapping is either pre-defined or broadcasted or dedicatedly signaled to the UE1.

Figure 4:
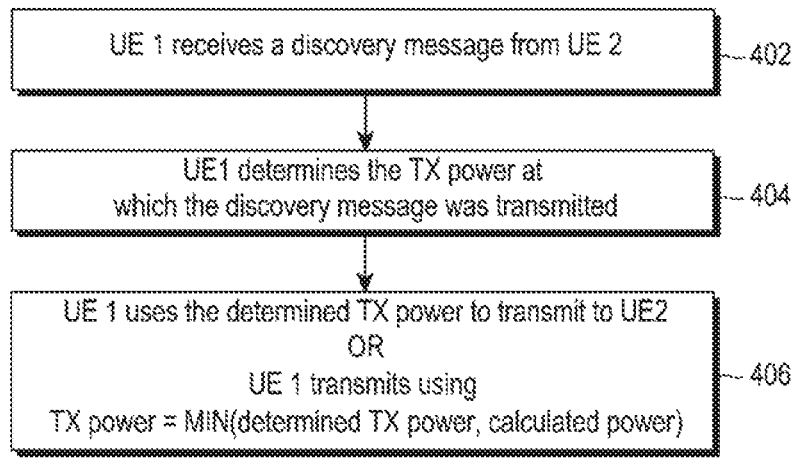
FIG. 4 is a flow diagram illustrating a method of determining transmission power information by user equipment (UE) in a device to device (D2D) communication network, according to an embodiment of the present invention.

FIG. 4 is a flow diagram illustrating a method of determining transmission power information by user equipment (UE) in a device to device (D2D) communication network, according an embodiment of the present invention. In one embodiment, UE (say UE1) determines the transmission power for transmission to another UE (i.e UE2) by performing the following steps.

At step 402, the UE1 receives a message i.e. discovery message from the UE2. The message could be a data packet, control packet or some signal transmitted by the UE2. At step 404, the UE1 determines the transmission power at which the discovery message is transmitted by the UE2 as described above in the embodiments 1-4. At step 406, the UE1 uses the determined transmission power at which the UE 2 has transmitted to the UE1, for transmitting back to the UE2.

Alternatively, the UE1 calculates the determined transmission power as defined in prior art but uses the determined transmission power at which the UE2 has transmitted to the UE1 if the calculated transmission power is more than the determined transmission power at which the UE2 has transmitted to the UE1. If the calculated transmission power is lesser than the determined transmission power at which the UE2 has transmitted to the UE1 then the UE 1 uses the calculated transmitted power. The calculating of the transmitting power at the UE1 could be fixed or based on the range class, etc.

Figure 5:
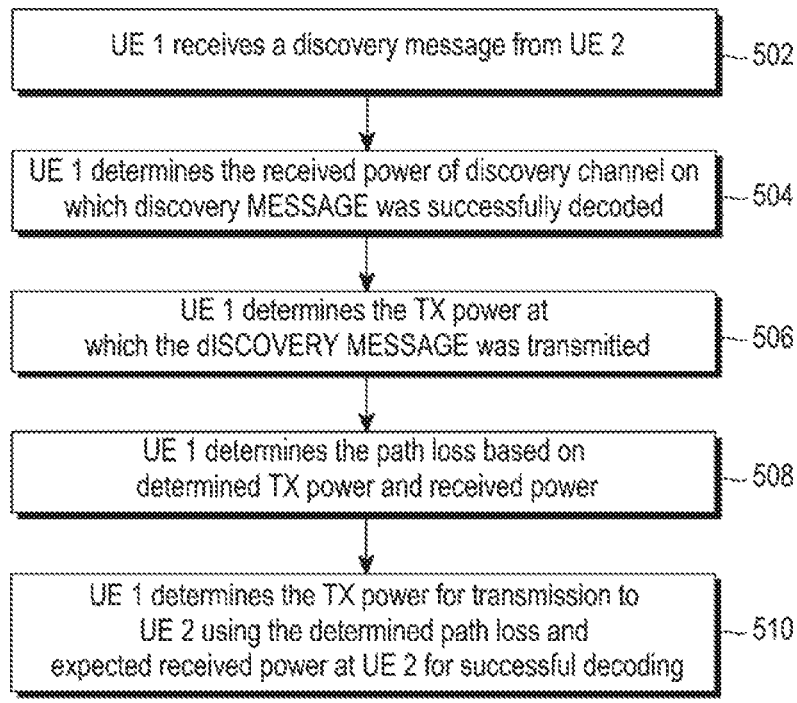
FIG. 5 is a flow diagram illustrating a method of determining transmission power information by user equipment (UE) in a device to device (D2D) communication network, according to another embodiment of the present invention.

FIG. 5 is a flow diagram illustrating a method of determining transmission power information by user equipment (UE) in a device to device (D2D) communication network, according to another embodiment of the present invention. In one embodiment, the UE (i.e. UE1) determines the transmission power for transmission to another UE (i.e. UE2) by performing the following steps.

At step 502, the UE1 receives a message i.e. discovery message from the UE2. In one embodiment, the UE1 receives multiple discovery messages and averages the reception power at which the discovery message is received. The message could be a data packet, control packet or some signal transmitted by the UE2. Then the UE1 determines the reception power of discovery channel on which the discovery message/signal is received and successfully decoded at step 504. Power is measured over the time and frequency resources in which the discovery message is received. At step 506, the UE1 then determines the transmission (TX) power at which the discovery message is transmitted by the UE2 as described above embodiments 1-4. Further at step 508, the path loss is determined (or calculated) by the UE1 based on the determined transmission power and reception power. At step 510, the UE1 then determines the power for transmission to the UE2 using the determined path loss and reception power at the UE2 for successful decoding. For example, if reception power at the UE2 for successful decoding is 'X' and path loss is 'Y' then the transmission power=X+Y.

Figure 6:
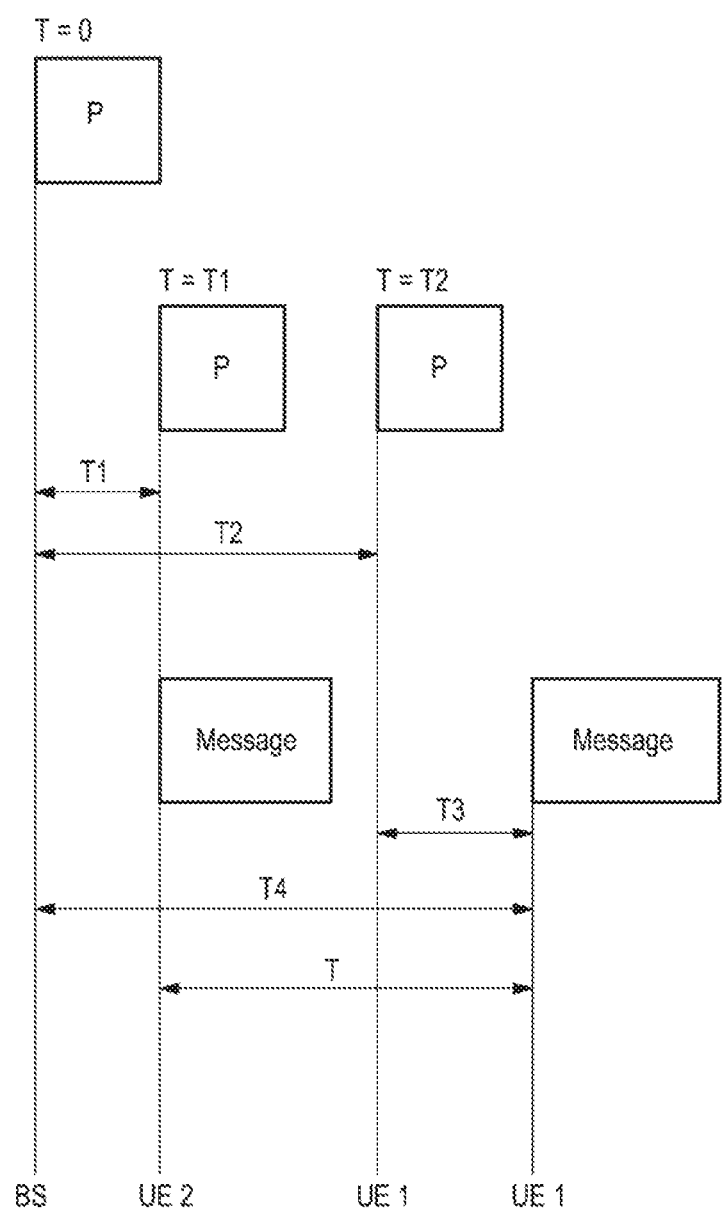
FIG. 6 is a flow diagram illustrating a method of determining proximity of a user equipment (UE) in a device to device (D2D) communication network, according to another embodiment of the present invention.

FIG. 6 is a flow diagram illustrating a method of determining the range of UE (i.e. UE 2) by another UE (i.e. UE 1), according to an embodiment of the present invention. The UE1 receives a message i.e. discovery message from the UE2. The message could be a data packet, control packet or some signal transmitted by UE2. The UE2 also transmits a value of its propagation delay 'T1' between the UE2 and a base station (BS) in the discovery message. The UE2 knows the timing advance configured by the BS which the UE used to transmit to the BS. Propagation delay is half of the timing advance. The UE1 then determines the time T4, where T4='T2'−'T3' if T2'>='T3' and T4='T2'+'T3' if T2'<'T3'. 'T2' is the propagation delay between UE1 and BS; 'T3' is the time at which UE1 receives transmission from UE2 with respect to time at which UE1 receives transmission from BS. Further UE1 determines the time T=T4−T1 wherein T is the propagation delay between UE1 and UE2. Once the time T is determined, UE1 determines range, where range=Speed of light*T.

Although the invention of the method has been described in connection with the embodiments of the present invention illustrated in the accompanying drawings, it is not limited thereto. It will be apparent to those skilled in the art that various substitutions, modifications and changes may be made thereto without departing from the scope and spirit of the invention.

The invention claimed is:

1. A method of determining proximity of a device-to-device (D2) user equipment (UE) in a D2D communication network, the method comprising:
receiving, by a first UE, a discovery message from a second UE;
measuring, by the first UE, reception power of the received discovery message;
identifying, by the first UE, information on a transmission power of the discovery message upon transmitting the discovery message at the second UE, the information on the transmission power being provided by the second UE;
determining, by the first UE, a path loss based on a difference between the transmission power and the reception power; and
determining, by the first UE, a proximity of the second UE relative to the first UE based on the determined path loss.

2. The method of claim 1, further comprising:
receiving, from a base station, information indicating a resource pool of a resource used for receiving the discovery message,
wherein the transmission power of the discovery message is indicated by the resource pool.

3. The method of claim 1, further comprising:
receiving, from a base station, information indicating a resource pool of a resource used for receiving the discovery message; and
obtaining a range class indicated the resource pool, the range class associated with the proximity of the second UE to the first UE,
wherein the obtained range class is pre-mapped to a transmission power.

4. The method of claim 1, further comprising:
identifying a discovery code in the received discovery message;
transmitting, to a D2D server, the identified discovery code; and
receiving, from the D2D server, a range class or the information on the transmission power associated with the discovery code.

5. The method of claim 3, wherein the information on the transmission power or the range class is obtained from an application layer.

6. A method of determining a transmission power in a device-to-device (D2D) communication network, the method comprising:
receiving by a first user equipment (UE), a discovery message from a second UE;
identifying, by the first UE, information on a first transmission power of the received discovery message upon transmitting the discovery message at the second UE, the information on the first transmission power being provided by the second UE; and
determining, by the first UE, a second transmission power for transmitting a response message to the second UE, based on the information on the first transmission power.

7. The method of claim 6, further comprising:
receiving, from a base station, information indicating a resource pool of a resource used for receiving the discovery message,
wherein the first transmission power is indicated by the resource pool.

8. The method of claim 6, further comprising:
receiving, from a base station, information on a resource pool of a resource used for receiving the discovery message; and
obtaining a range class indicated the resource pool, the range class associated with a proximity of the second UE to the first UE,
wherein the obtained range class is pre-mapped to a transmission power, and is broadcasted to the first UE or dedicatedly signaled to the first UE.

9. The method of claim 6, further comprising:
identifying a discovery code received in the received discovery message;
transmitting, to a D2D server, the identified discovery code; and receiving, from the D2D server, a range class or the information on the transmission power associated with the discovery code.

10. The method of claim 6, further comprising:
transmitting, to the second UE, by the first UE, the response message with the second transmission power.

11. The method of claim 6, further comprising:
calculating a third transmission power upon transmitting the response message at the first UE; and
transmitting, to the second UE, another message at the first transmission power or the third transmission power based on whether the calculated third transmission power is greater than the first transmission power.

12. The method of claim 6, further comprising:
determining, by the first UE, a path loss based on the first transmission power;
determining, by the first UE, a proximity of the second UE relative to the first UE based on the determined path loss; and
determining, by the first UE, the second transmission power based on the determined proximity of the second UE relative to the first UE.

13. A user equipment (UE) for determining proximity of a device-to-device (D2D) UE in a D2D communication network, the UE comprising:
a transceiver; and
a processor configured to:
control the transceiver to receive a discovery message from a neighboring UE;
measure a reception power of the received discovery message;
identify information on a transmission power of the discovery message upon transmitting the discovery message at the neighboring UE, the information on the transmission power being provided by the neighboring UE;
determine a path loss based on a difference between the transmission power and the reception power; and
determine a proximity of the neighboring UE relative to the UE based on the determined path loss.

14. The UE of claim 13, wherein the processor is further configured to:
control the transceiver to receive, from a base station, information indicating a resource pool of a resource used for receiving the discovery message,
wherein the transmission power of the discovery message is indicated by the resource pool.

15. The UE of claim 13, wherein the processor is further configured to:
control the transceiver to receive, from a base station, information indicating a resource pool of a resource used for receiving the discovery message; and
obtain a range class indicated by the resource pool, the range class associated with the proximity of the neighboring UE to the UE,
wherein the obtained range class is pre-mapped to a transmission power.

16. A user equipment (UE) for determining a transmission power in a device-to-device (D2D) communication network, the UE comprising:
a transceiver; and
a processor configured to:
control the transceiver to receive a discovery message from a neighboring UE;
identify information on a first transmission power of the received discovery message upon transmitting the discovery message at the neighboring UE, the information on the first transmission power being provided by the neighboring UE; and
determine a second transmission power for transmitting a response message to the neighboring UE based on the information on the first transmission power.

17. The UE of claim 16, wherein the processor is further configured to:
control the transceiver to receive, from a base station, information indicating a resource pool of a resource used for receiving the discovery message,
wherein the first transmission power is indicated by the resource pool.

18. The UE of claim 16, wherein the processor is further configured to:
control the transceiver to receive, from a base station, information on a resource pool of a resource used for receiving the discovery message; and
obtain a range class indicated by the resource pool, the range class associated with a proximity of the neighboring UE to the UE,
wherein the obtained range class is pre-mapped to a transmission power, and is broadcasted to the UE or dedicatedly signaled to the UE.

19. The UE of claim 16, wherein the processor is further configured to:
calculate a third transmission power upon transmitting the response message at the UE; and
transmit, to the neighboring UE, another message at the first transmission power or the third transmission power based on whether the calculated third transmission power is greater than the first transmission power.

20. The UE of claim 16, wherein the processor is further configured to:
determine a path loss based on the first transmission power;
determine a proximity of the neighboring UE relative to the UE based on the determined path loss; and
determine the second transmission power based on the determined proximity of the neighboring UE relative to the UE.

* * * * *